(12) United States Patent
Yogo

(10) Patent No.: US 8,056,387 B2
(45) Date of Patent: Nov. 15, 2011

(54) BENDING DEVICE

(75) Inventor: Teruaki Yogo, Seto (JP)

(73) Assignee: Kabushiki Kaisha Opton (JP)

( * ) Notice: Subject to any disclaimer, the term of this patent is extended or adjusted under 35 U.S.C. 154(b) by 566 days.

(21) Appl. No.: 11/742,783

(22) Filed: May 1, 2007

(65) Prior Publication Data

US 2007/0199361 A1    Aug. 30, 2007

(51) Int. Cl.
| | |
|---|---|
| *B21D 43/10* | (2006.01) |
| *B21D 7/024* | (2006.01) |
| *B21D 7/04* | (2006.01) |
| *B21D 7/12* | (2006.01) |
| *B21D 55/00* | (2006.01) |
| *B21D 43/00* | (2006.01) |

(52) U.S. Cl. ............... 72/422; 72/20.5; 72/149; 72/419
(58) Field of Classification Search ............ 72/306–307, 72/422, 419–421, 361, 20.5, 149, 155, 156, 72/295, 298, 387
See application file for complete search history.

(56) References Cited

U.S. PATENT DOCUMENTS

| | | | | |
|---|---|---|---|---|
| 3,431,759 | A * | 3/1969 | Whittingham et al. | .... 72/405.09 |
| 5,291,771 | A * | 3/1994 | Tomo et al. | ....... 72/306 |
| 6,237,380 | B1 * | 5/2001 | Kanamori | ....... 72/14.8 |
| 6,612,143 | B1 * | 9/2003 | Butscher et al. | ....... 72/307 |
| 2006/0065034 | A1* | 3/2006 | Yogo | ....... 72/306 |

FOREIGN PATENT DOCUMENTS

| | | |
|---|---|---|
| JP | 2299724 | 12/1990 |
| JP | 03128126 A * | 5/1991 |
| JP | 5212450 | 8/1993 |
| JP | 9308918 | 12/1997 |
| JP | WO 2006049165 | 5/2006 |

OTHER PUBLICATIONS

International Search Report for PCT/JP2005/020104, JPO, Jan. 16, 2006.
International Preliminary Report on Patentability, WIPO, PCT/JP2005/020104; Jun. 5, 2007.
Korean Office Action and English Translation of Pertinent Part, dated Nov. 25, 2010, pp. 1-7.
Notice of Reason(s) for Rejection, issued on Apr. 5, 2011 Japanese patent application No. 2006-542400, Japanese Patent Office.

* cited by examiner

*Primary Examiner* — Dana Ross
*Assistant Examiner* — Mohammad I Yusuf
(74) *Attorney, Agent, or Firm* — Bourque and Associates, PA

(57) ABSTRACT

A bending device has a bending mechanism for bending an elongate object to be processed by holding the object by both a bending die and a clamping die and revolving the clamping die which is able to revolve around the bending die. The bending device includes a fixing base on which the bending mechanism is mounted. A chuck mechanism for holding the object is provided in the bending device, and the bending device is provided with an articulated robot for moving the chuck mechanism.

5 Claims, 14 Drawing Sheets

BENDING DEVICE

TECHNICAL FIELD

The present invention relates to a bending device for bending an elongate object, for example, a pipe, a rod-shaped member, by moving the same when bending the object in a predetermined direction. The present invention relates to a bending device for bending an elongate object, for example, a pipe, a rod-shaped member, by moving the same when bending the object in a predetermined direction.

BACKGROUND ART

Conventionally, as described in Patent Document 1, such a bending device has been known, in which an object is held by a chuck mechanism, a bending mechanism is attached to the distal end of an articulated robot having three sets of joints turning around an axis parallel to the axial direction of the object, the bending mechanism is moved to a predetermined position by turning the respective joints, simultaneously the chuck mechanism is moved by a moving mechanism in the axial direction of the object, and bending is carried out at a plurality of points.

Patent Document 1: Japanese Published Unexamined Patent Application No. 2001-212624

DISCLOSURE OF THE INVENTION

Objects to be Solved by the Invention

However, in such a prior art, since such a structure is employed in which the chuck mechanism is moved by a moving mechanism and an object is moved in the axial direction, the moving mechanism needs a space in which the moving mechanism moves the chuck mechanism having an object held thereon, wherein there is a problem that the apparatus becomes large in size, resulting in an increase in its installation space.

It is therefore an object of the present invention to provide a bending device that is small in size and needs less installation space.

Also, it is another object of the present invention to provide a bending device in which it is easy to load an object to be processed.

Means for Solving the Objects

In order to solve such problems, the present invention employed the following means. That is, a bending device having a bending mechanism for bending an elongate object to be processed by holding the object by both a bending die and a clamping die and revolving the clamping die which can revolve around the bending die, includes a fixing base on which the bending mechanism is mounted, wherein a chuck mechanism for holding the object is provided in the bending device, and the bending device is provided with an articulated robot for moving the chuck mechanism.

The articulated robot may be provided with a plurality of bending joints for carrying out bending motions and a plurality of turning joints for making swivel motions. In addition, the bending device is provided with a controlling unit for controlling the articulated robot, the bending mechanism and the chuck mechanism, wherein the controlling unit may be provided with a bending control unit for controlling bending processes at a plurality of points by moving the chuck mechanism by means of the articulated robot. Further, the controlling mechanism holds the middle portion of an object by the chuck mechanism when loading the object, and holds the distal end portion of the object by the chuck mechanism when carrying out a bending process by controlling the articulated robot, the bending mechanism and the chuck mechanism.

Effects of the Invention

Since a bending device according to the present invention bends an object by moving an object, which the articulated robot holds by the chuck mechanism, with respect to a fixed bending mechanism, such effects can be brought about, by which the device can be made small in size and needs less installation space.

Since, in the bending device according to the present invention, the middle portion of an object is held by the chuck mechanism when loading the object, and the distal end portion of the object is held by the chuck mechanism when carrying out a bending process, such an effect can be brought about, by which it becomes easy for the object to be loaded.

Figure 1:
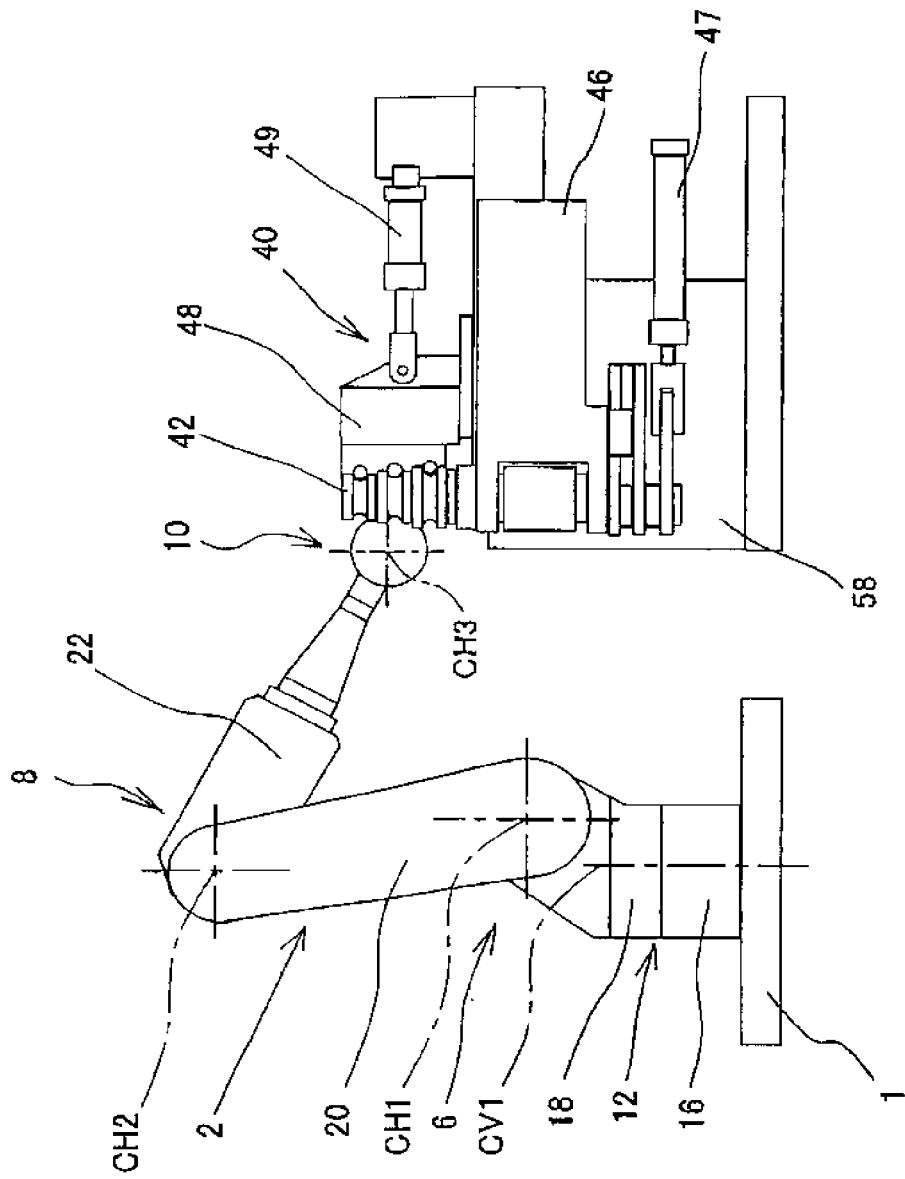
FIG. 1 is a front elevational view of a bending device as Embodiment 1 of the present invention.

DESCRIPTION OF THE SYMBOLS 1,110 Device bases
2,140 Articulated robots
4,180 Objects
6 First bending joint
8 Second bending joint
10 Third bending joint
12 First turning joint
14 Second turning joint
20,142 First arms 22,144 Second arms
26,148 Distal end arms
28 Auxiliary joint
30,150 Chuck mechanisms
32 Turning joint
40,120 Bending mechanisms
42,122 Bending dies
46 Bending arm
48,124 Clamping dies
50 Wiper die
52,126 Pressure dies
58 Fixing base
60 Mandrel mechanism
62 Compression mechanism
70 Control circuit
152 Notch
160 Mandrel device

BEST MODE FOR CARRYING OUT THE INVENTION

Hereinafter, a detailed description is given of a best mode for carrying out the present invention, with reference to the accompanying drawings.

Embodiment 1

Figure 2:
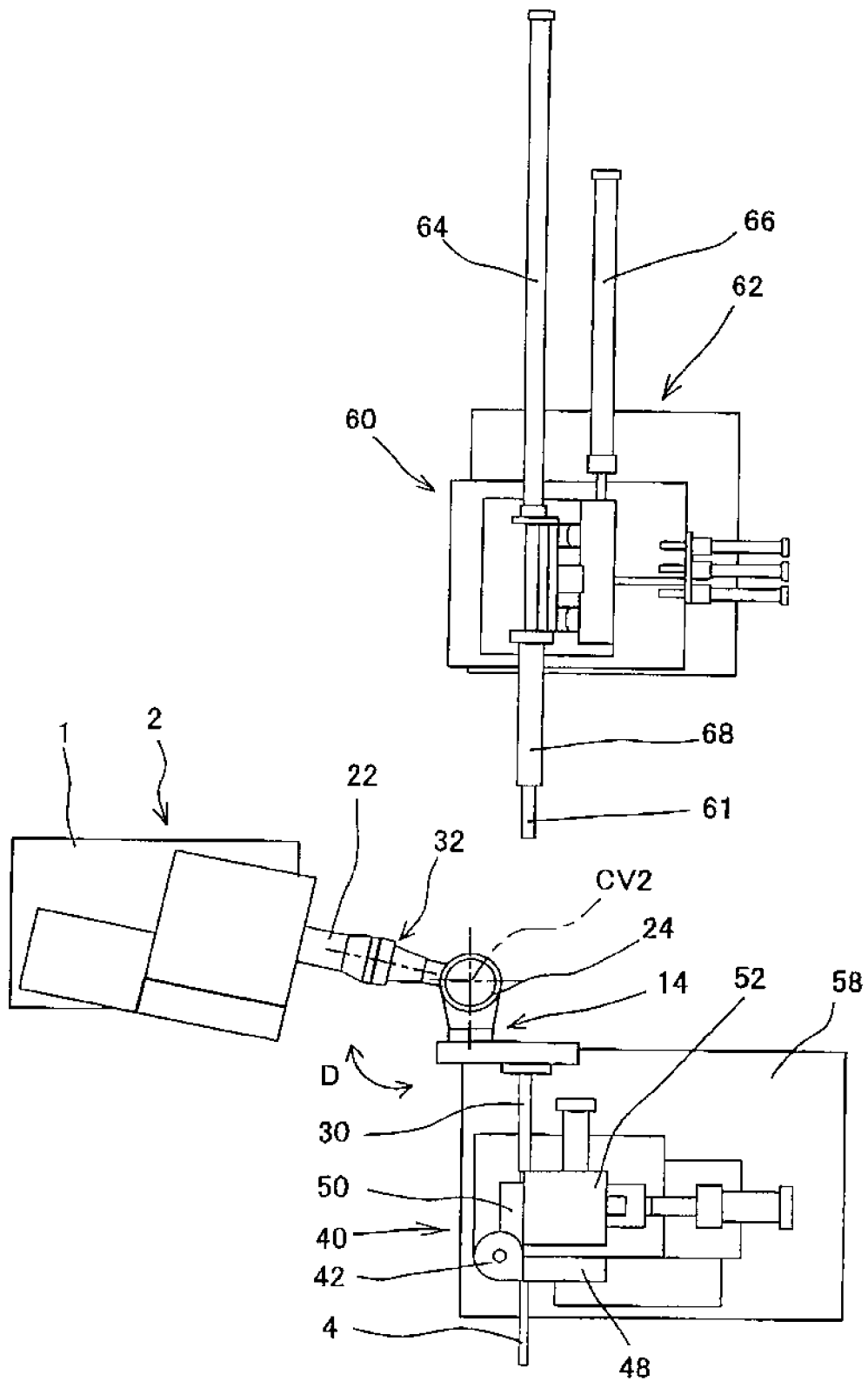
FIG. 2 is a plan view of the bending device according to Embodiment 1.
Figure 3:
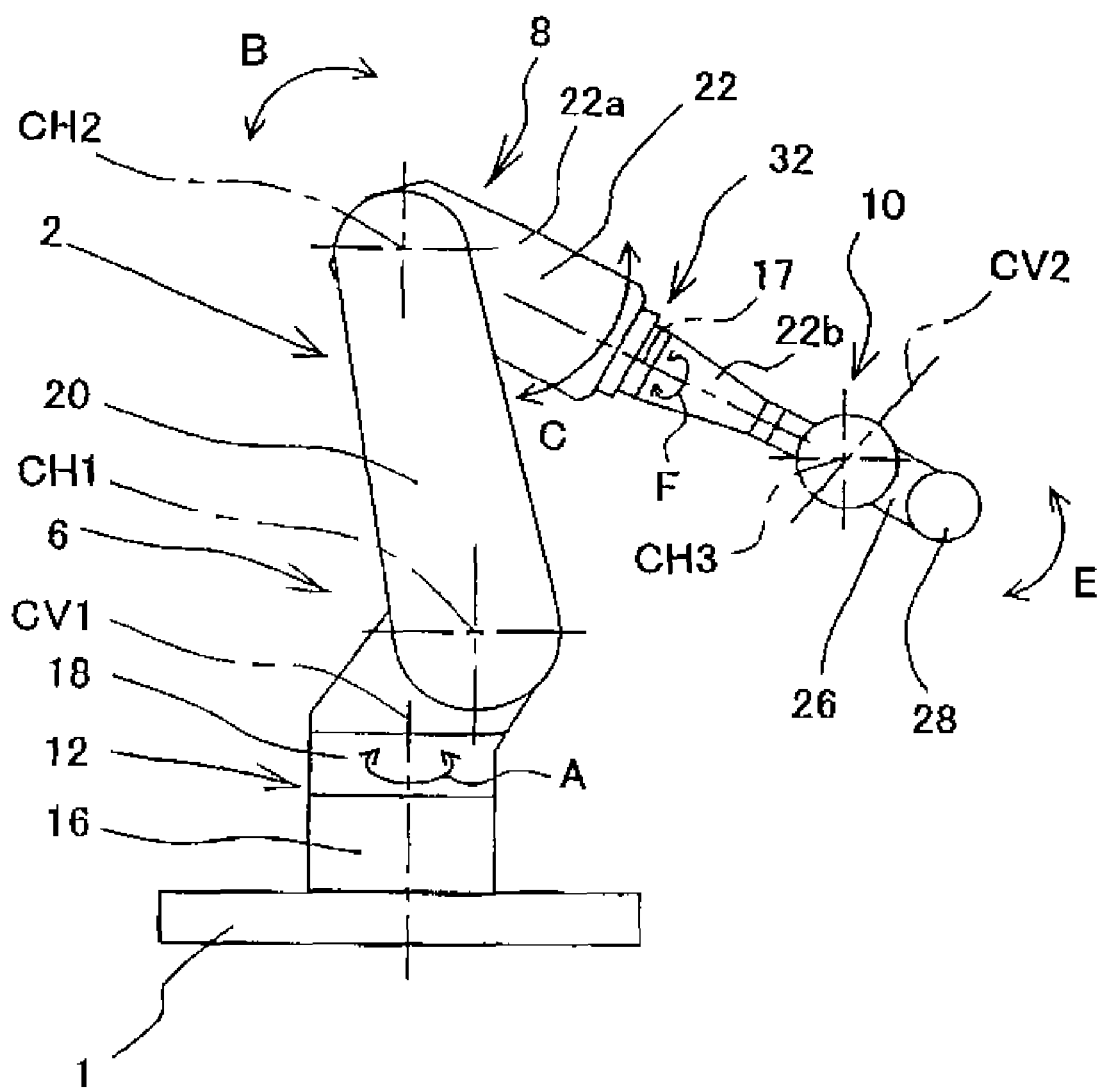
FIG. 3 is a front elevational view of an articulated robot according to Embodiment 1.

As shown in FIG. 1 through FIG. 3, reference numeral 1 denotes a device base on which an articulated robot 2 is placed. The articulated robot 2 is provided with a chuck mechanism 30 for holding an elongate object 4 such as a pipe, etc. The articulated robot 2 is provided with three bending joints 6, 8 and 10 for carrying out bending motions, and three turning joints 12, 14, and 32 for carrying out swivel motions.

The bending joint means a joint in which a bending axis extends in the direction orthogonal to the link direction of two members connected to each other by a joint, and the turning joint means a joint in which a swivel axis extends in the same direction as the link direction of two members connected to each other by a joint.

The articulated robot 2 is provided with a fixing portion 16 attached to the device base 1, and the fixing portion 16 and the first swivel base 18 are connected to each other by the first turning joint 12. The first turning joint 12 has a mechanism for driving and turning the first swivel base 18 around the vertical axis CV1 (Refer to FIG. 3) within a predetermined angle. The turning direction of the first swivel base 18 is shown by the arrow A in FIG. 3.

One end of the first arm 20 is connected to the first swivel base 18 via the first bending joint 6. The first bending joint 6 has a mechanism for driving and turning the first arm 20 around the horizontal axis CH1 (Refer to FIG. 3) within a predetermined angle. The horizontal axis CH1 of the first bending joint 6 is orthogonal to the vertical axis CV1 of the first turning joint 12. The turning direction of the first arm 20 is shown by the arrow B in FIG. 3.

The other end of the first arm 20 and one end of the second arm 22 are connected to each other via the second bending joint 8. The second bending joint 8 has a mechanism for driving and turning the second arm 22 around the axis CH2 (Refer to FIG. 3) parallel to the horizontal axis CH1 of the first bending joint 6 within a predetermined angle. The turning direction of the second arm 22 is shown by the arrow C in FIG. 3.

The second swivel base 24 (Refer to FIG. 2) is connected to the other end of the second arm 22 via the second turning joint 14. The second turning joint 14 has a mechanism for driving and turning the second swivel base 24 around the axis CV2 orthogonal to the horizontal axes CH1 and CH2 of the first and second bending joints 6 and 8 within a predetermined angle. The turning direction of the second swivel base 24 is shown by the arrow D in FIG. 2. One end of the distal end arm 26 is connected to the second swivel base 24 via the third bending joint 10. The third bending joint 10 turns the distal end arm 26 around the axis CH3 (Refer to FIG. 3) parallel to the horizontal axes CH1 and CH2 of the first and second bending joints 6 and 8. The turning direction of the distal end arm 26 is shown by the arrow E in FIG. 3.

The second arm 22 is provided with the third turning joint 32, and the rear portion 22b of the second arm 22 makes a twisting motion with respect to the front portion 22a around the swivel axis 17 (Refer to FIG. 3). The turning direction of the rear portion 22b is shown by the arrow F in FIG. 3.

In addition, since the second turning joint 14 and the second swivel base 24, which are shown in FIG. 2, are hidden in FIG. 3, it is noted that these members do not appear in FIG. 3.

Also, as shown in FIG. 3, an auxiliary joint 28 is provided at the other end of the distal end arm 26, and a chuck mechanism 30 is attached to the auxiliary joint 28. The auxiliary joint 28 is mechanically connected with the third bending joint 10 by a gear mechanism (not illustrated). The chuck mechanism 30 is constructed such that, as the distal end arm 26 is turned by 360 degrees by the third bending joint 10, the chuck mechanism 30 is turned by 360 degrees by the auxiliary joint 28. Further, the auxiliary joint 28 may be embodied so that it can swivel independently from the third bending joint 10.

The chuck mechanism 30 holds an end of an object 4, wherein if the object 4 is a pipe, it may hold the object on its outer circumference or may hold it on its inner circumference. The object 4 held by the chuck mechanism 30 is attached so that it becomes parallel to the axes CH1 through CH3 of the first through the third bending joints 6, 8 and 10. In addition, the chuck mechanism 30 may be configured so that it holds an end of the object 4 or an intermediate part thereof.

Figure 4:
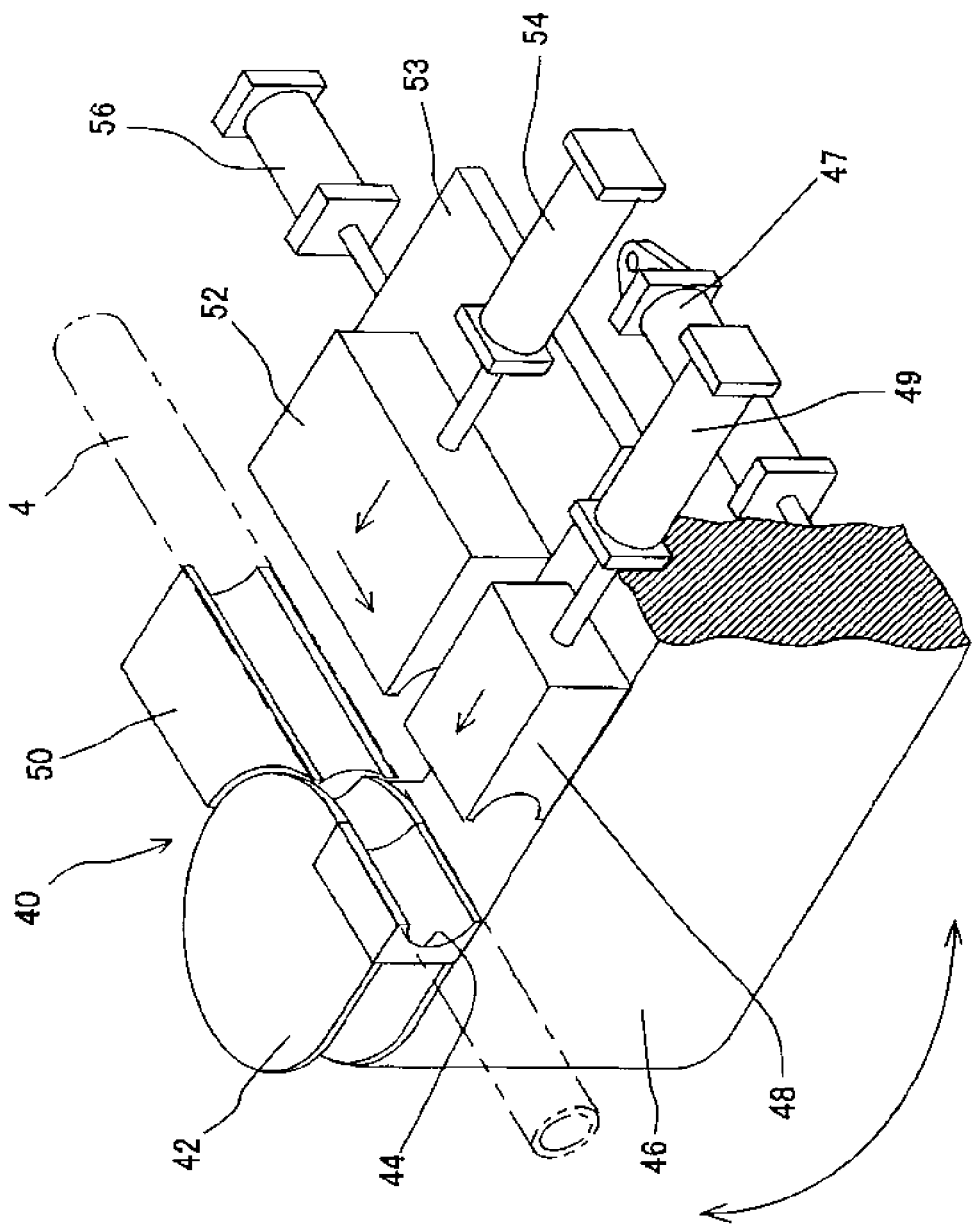
FIG. 4 is an enlarged perspective view of a bending mechanism according to Embodiment 1.

As shown in FIG. 4, the bending mechanism 40 is provided with a bending die 42 formed in compliance with a bending radius of an elongate object 4 such as a pipe, and a groove 44 complying with the diameter of the object 4 is formed on the outer circumference of the bending die 42. The bending die 42 is pivotally supported along with the bending arm 46, and the bending arm 46 is attached so as to be driven and rotated by the first cylinder 47. The bending die 42, which has a single groove 44, is shown in FIG. 4. However, as shown in FIG. 1, the bending die 42 may be configured such that a plurality of grooves 44 is stacked in response to the bending radius of the object 4.

The clamping die 48 is movably and pivotally supported on the bending arm 46, facing the bending die 42, and the clamping die 48 is constructed so that it is driven by the second cylinder 49 and the object 4 is held between the bending die 42 and the clamping die 48. Also, the wiper die 50 is disposed close to the bending die 42, and the pressure die 52 is movably supported on the slide base 53, facing the wiper die 50. The pressure die 52 is constructed so that it is driven by the third cylinder 54, is applied to the object 4 and receives a reaction force when carrying out a bending process. The slide base 53 is constructed so that it is supported slidably in the axial direction of the object 4, and is driven by the cylinder 56.

The bending mechanism 40 is attached on the fixing base 58. The mandrel mechanism 60 and the compression mechanism 62 are juxtaposed to the fixing base 58. The mandrel mechanism 60 inserts a mandrel 61 into a pipe as an object 4 by a cylinder 64, and the compression mechanism 62 gives a compression force to the object 4 in the axial direction via the chuck mechanism 30 by a compression shaft 68 by means of a cylinder 66 when carrying out a bending process.

Figure 5:
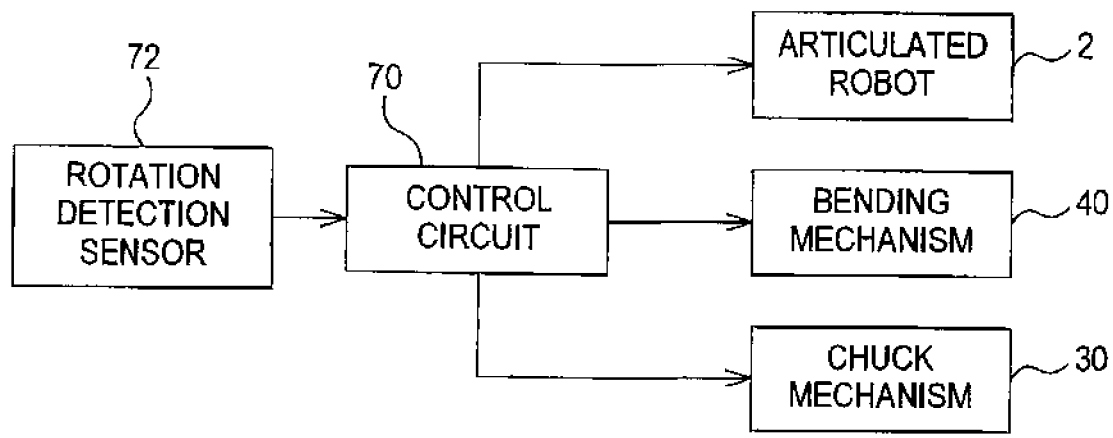
FIG. 5 is a block diagram showing a control system of the bending device according to Embodiment 1.

As shown in FIG. 5, the articulated robot 2, the chuck mechanism 30 and the bending mechanism 40 are connected to the control circuit 70 operating as controlling unit, and the turning angle of the bending arm 46 is detected by a rotation detection sensor 72 employing an encoder, and is outputted to the control circuit 70.

Figure 6:
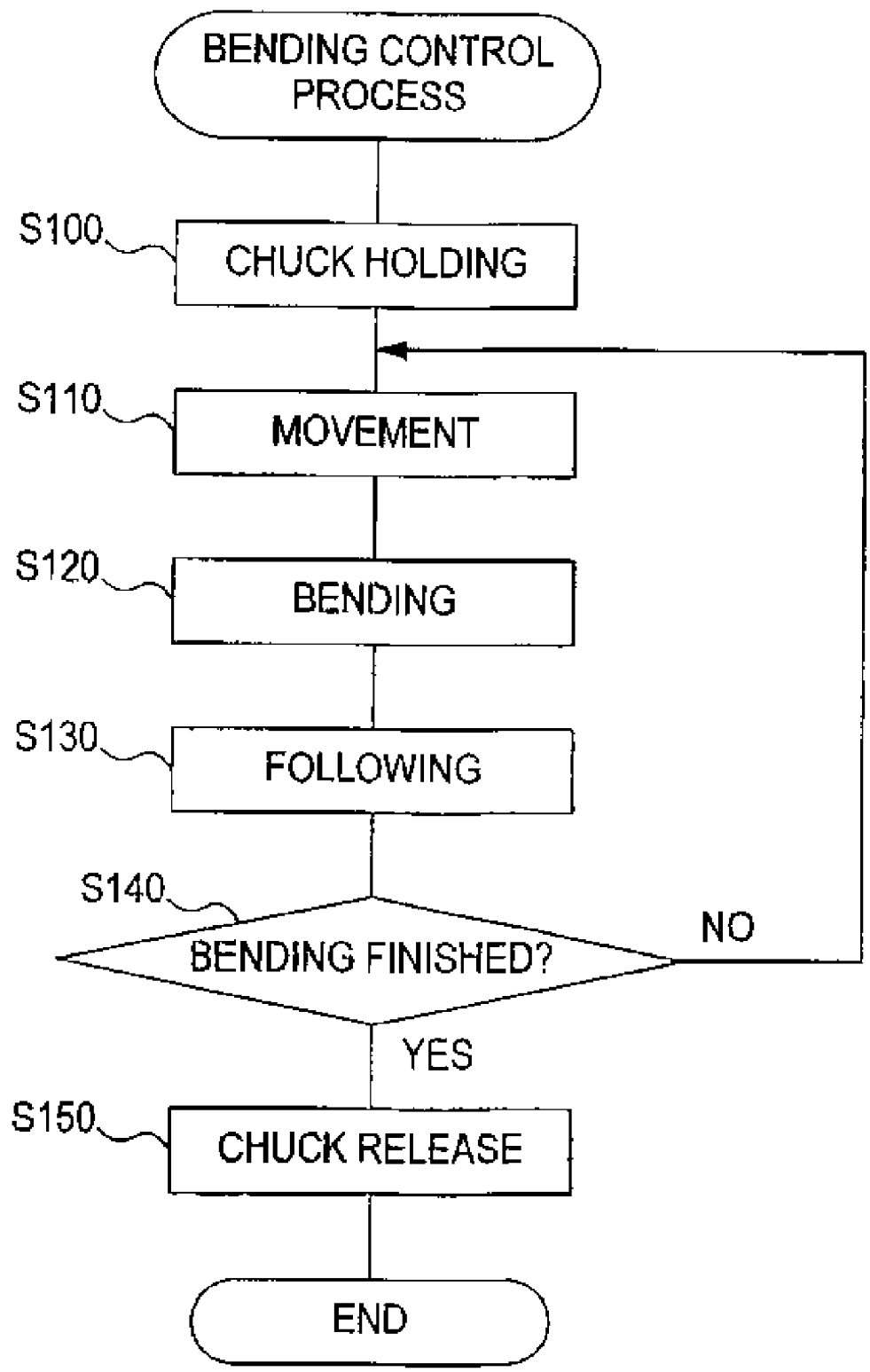
FIG. 6 is a flowchart showing one example of a bending process control carried out in the control circuit of Embodiment 1.

Next, a description is given of operations of the above-described bending device based on the flowchart shown in FIG. 6 along with the bending control process carried out in the control circuit 70.

First, after the first through the third bending joints 6, 8 and 10 of the articulated robot 2, and the first and the second turning joints 12 and 14 thereof are driven, and the chuck mechanism 30 is moved to the end of an object 4, the end of the object 4 is held by the chuck mechanism 30 by controlling the chuck mechanism 30 (Step 100).

And, the object 4 is moved to the bending mechanism 40 (Step 110) by driving the first through the third bending joints 6, 8 and 10 of the articulated robot 2, and the first and the second turning joints 12 and 14 thereof. At this time, as shown in FIG. 4, the object 4 is moved so that the bending position of the object 4 is inserted into the groove 44 of the bending die 42.

After the object 4 is moved, the clamping die 48 and the pressure die 52 are bumped against the object 4 by driving the same, and the bending arm 46 is turned around the bending die 42, wherein the clamping die 48 is revolved around the bending die 42, and simultaneously the pressure die 52 is moved in the axial direction of the object 4 by means of the slide base 53 by driving the cylinder 56. Thus, a bending process is carried out (Step 120).

In the present embodiment, since draw-bending is carried out, the object 4 is bent so as to be wound on the bending die 42. Also, when bending, a bending process may be carried out with a mandrel 61 inserted into the object 4 by the mandrel mechanism 60. In addition, a compression force may be given to the object in the axial direction via the compression shaft 68 by means of the compression mechanism 62. Further, when bending, the chuck mechanism 30 is caused to follow the object 4 (Step 130) by driving the first through the third bending joints 6, 8 and 10 of the articulated robot 2, and the first and the second turning joints 12 and 14 thereof. At this time, following of the articulated robot 2 is controlled in compliance with the turning angle of the bending arm 46, which is detected by the rotation detection sensor 72.

After the bending is completed, the bending arm 46, the clamping die 48 and the pressure die 52 are returned to their original positions. Where a next bending process is carried out (Step 140), Steps 110 through 130 are repeated, wherein by controlling the articulated robot 2, the chuck mechanism 30 is moved, the object 4 is moved to its next bending position, and the object 4 is bent by the bending mechanism 40. After the bending is completed, holding of the object 4 is released (Step 150) by controlling the chuck mechanism 30. Also, there is a plurality of bending points, the bending is commenced from the distal end side of the object 4, which is opposite to the chuck mechanism 30.

Thus, since the articulated robot 2 moves the object 4 to the bending mechanism 40 with the object 4 held by the chuck mechanism 30, and the object 4 is subjected to bending, the device can be made small in size, and needs less installation space. Also, in the present embodiment, execution of processes Steps 110 through 130 functions as the controlling unit for bending.

Embodiment 2

Next, with reference to FIG. 7 through FIG. 15, a description is given of a bending device according to Embodiment 2.

Figure 7:
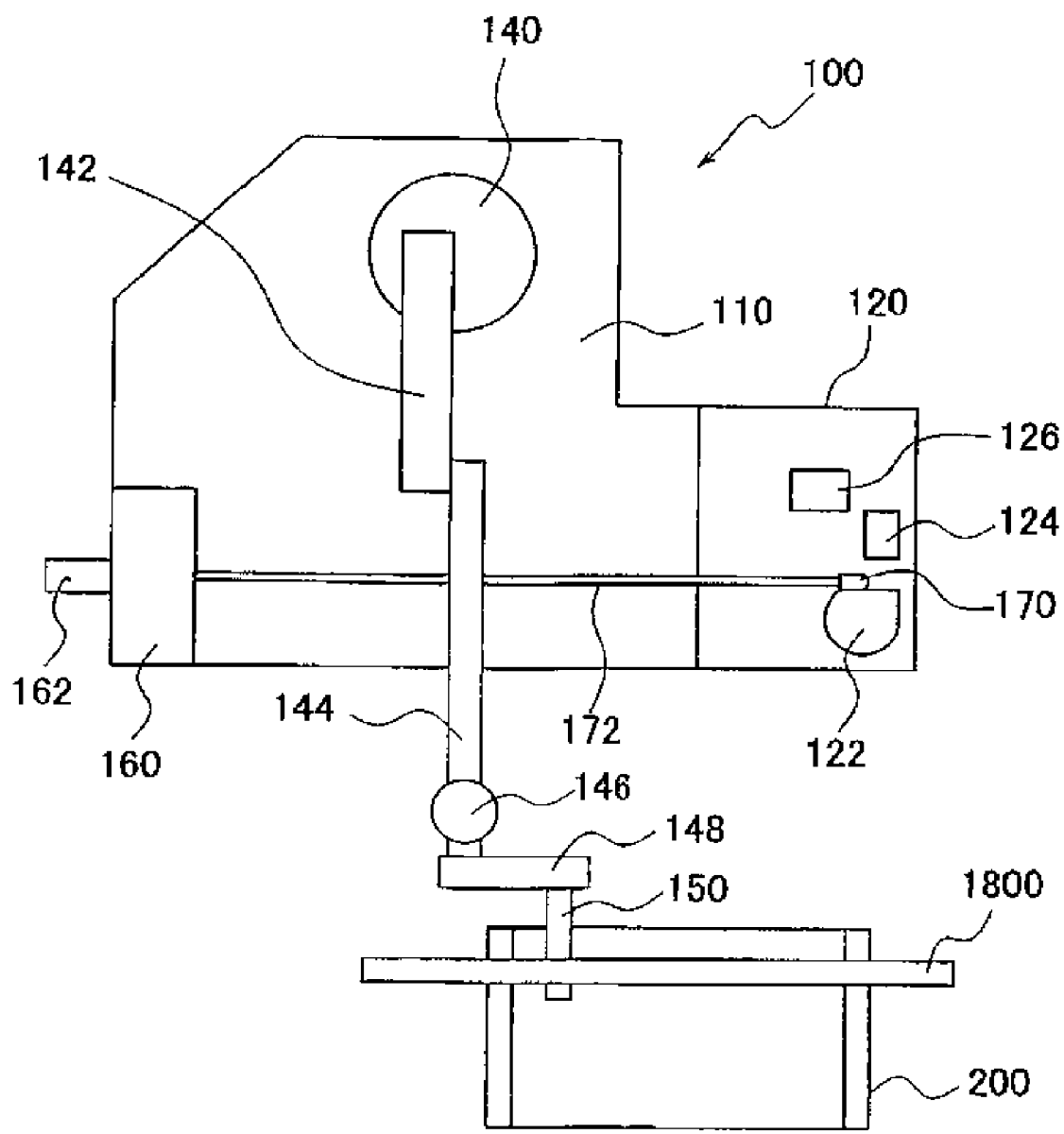
FIG. 7 is a plan view of the bending device according to Embodiment 2.

As shown in FIG. 7, a bending device 100 according to Embodiment 2 includes a device base 110, a bending mechanism 120, an articulated robot 140, and a mandrel device 160. The bending mechanism 120 is attached to one end of the device base 110, and the mandrel device 160 is attached to the other end of the device base 110, wherein the articulated robot is attached to the middle part of the device base 110.

Since the bending mechanism 120 has the same structure as that of the bending mechanism 40 described in Embodiment 1, its detailed description is omitted. However, in FIG. 7, reference numeral 122 denotes a bending die, 124 denotes a clamping die, and 126 denotes a pressure die.

Since the articulated robot 140 has the same structure as that of the articulated robot 2 described in Embodiment 1, its detailed description is omitted. However, in FIG. 7, reference numeral 142 denotes a first arm, 144 denotes a second arm, 146 denotes a turning joint attached to the distal end of the second arm, 148 denotes a distal end arm, and 150 denotes a chuck mechanism.

The mandrel device 160 holds a mandrel 170, and is provided with a cylinder 162 to move the mandrel 170 only by a predetermined slight distance in order to separate the mandrel 170 from the object 180 after the object 180 is bent. Since the diameter of the object 180 at a portion thereof bent by draw-bending becomes slightly smaller than the diameter before bending, the mandrel 170 does not move because of being brought into contact with the bent portion of the object 180 through bending. However, it is necessary to separate the mandrel 170 from the bent portion. A cylinder having a short stroke may be employed as the cylinder 162 to draw back the mandrel 170 by a slight distance. At this point, Embodiment 2 differs from Embodiment 1 in which it is necessary to pull out the mandrel 61 after bending. The cylinder 64 shown in FIG. 2 of Embodiment 1 has a long stroke. Also, Embodiment 2 does not require the cylinder 66 of Embodiment 1.

A placement base 200 on which a before-bending object 180 is placed is provided slightly apart from the bending device 100.

Figure 9:
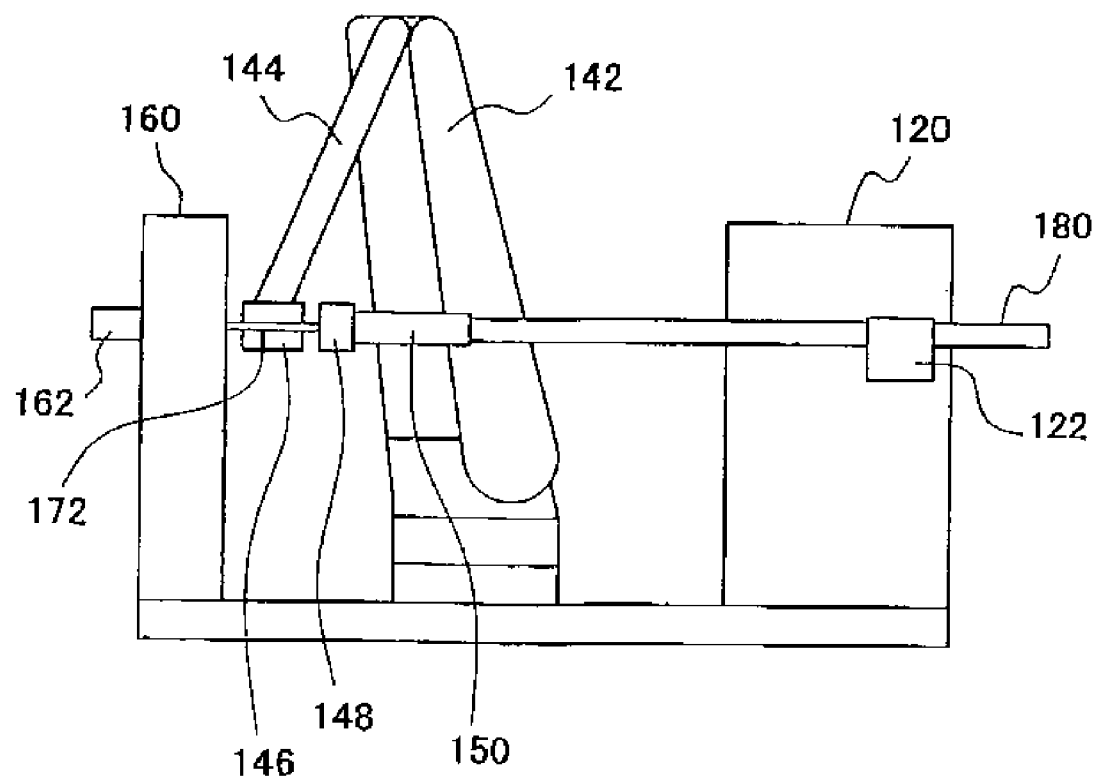
FIG. 9 is a front elevational view of a bending device according to Embodiment 2.
Figure 10:
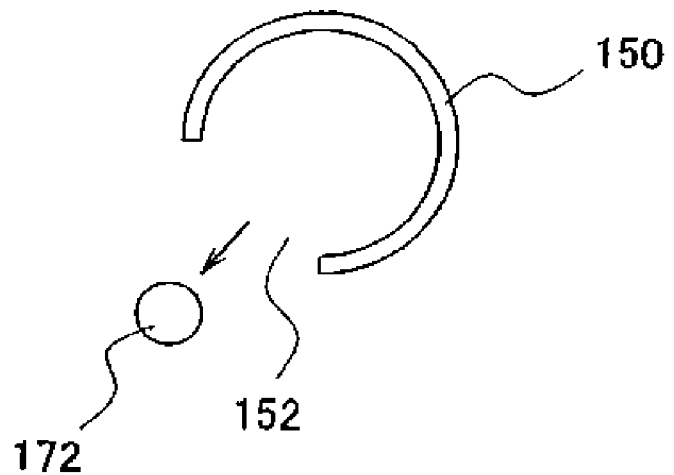
FIG. 10 is a sectional view showing a part of a chuck mechanism according to Embodiment 2.
Figure 11:
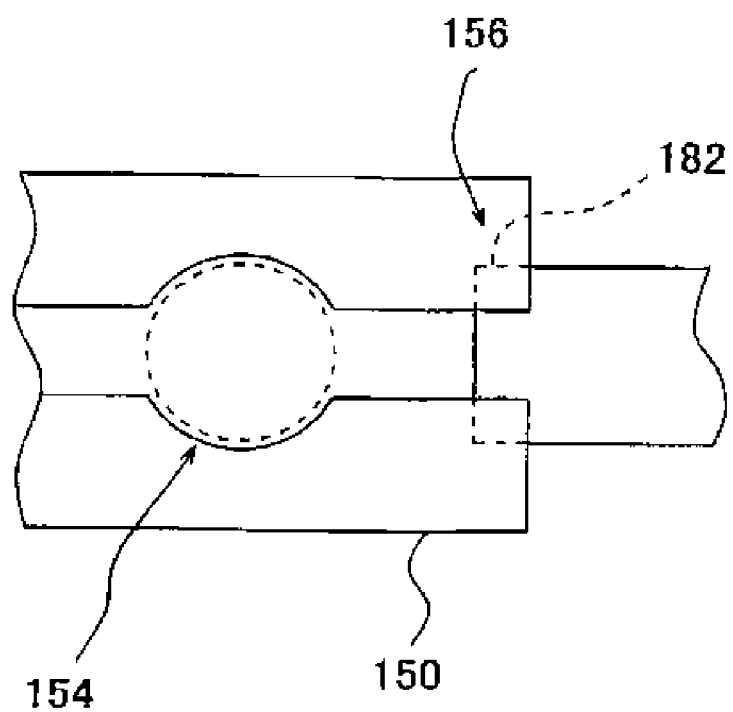
FIG. 11 is a schematic view showing a configuration of the chuck mechanism according to Embodiment 2.

As shown in FIG. 10, the chuck mechanism 150 is configured so that the section thereof is partially notched, and a rod 172 for supporting the mandrel 170 is inserted into the interior of the chuck mechanism 150 through the notched part 152. In addition, as shown in FIG. 11, the chuck mechanism 150 is provided with the first fixing portion 154 to chuck the middle part of a pipe 180 being an object and the second fixing portion 156 to chuck the distal end part 182 of the pipe 180. When the pipe 280 is chucked by the first fixing portion 154, the lengthwise direction of the pipe 180 is orthogonal to the lengthwise direction of the chuck mechanism 150. However, when the pipe 180 is chucked by the second fixing portion 156, these directions are made into the same direction. FIG. 7 shows a state where the object 180 is chucked by the first fixing portion 154 of the chuck mechanism 150. Also, FIG. 8 and FIG. 9 show a state where the object 180 is chucked by the second fixing portion 156 of the chuck mechanism 150.

Figure 8:
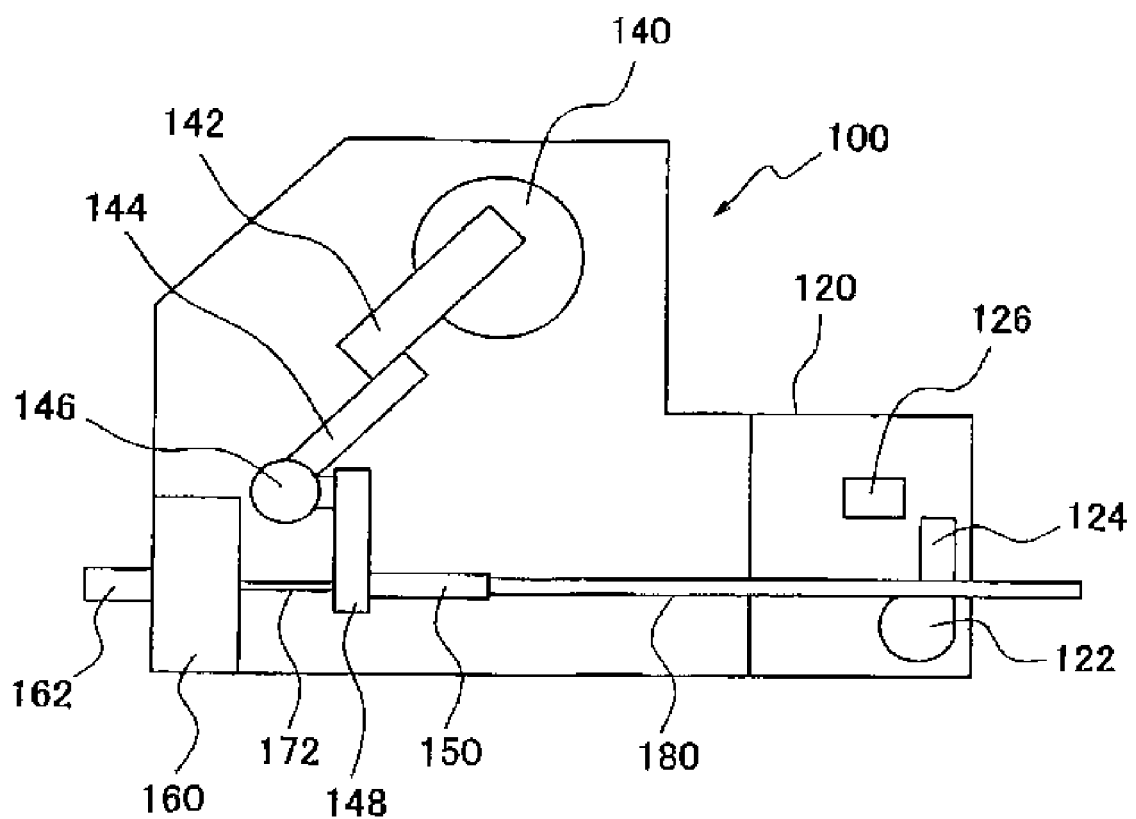
FIG. 8 is a plan view of the bending device according to Embodiment 2.

Although the object 180 is placed on the placement base 200 in the state shown in FIG. 7, the object 180 is loaded in the bending device 100 by operations of the articulated robot 140 in the state shown in FIG. 8 and FIG. 9, wherein the object 180 is clamped by the bending die 122 and the clamping die 124 of the bending mechanism 120, and a state in which a bending process becomes available for the object 180 is brought about.

Figure 12:
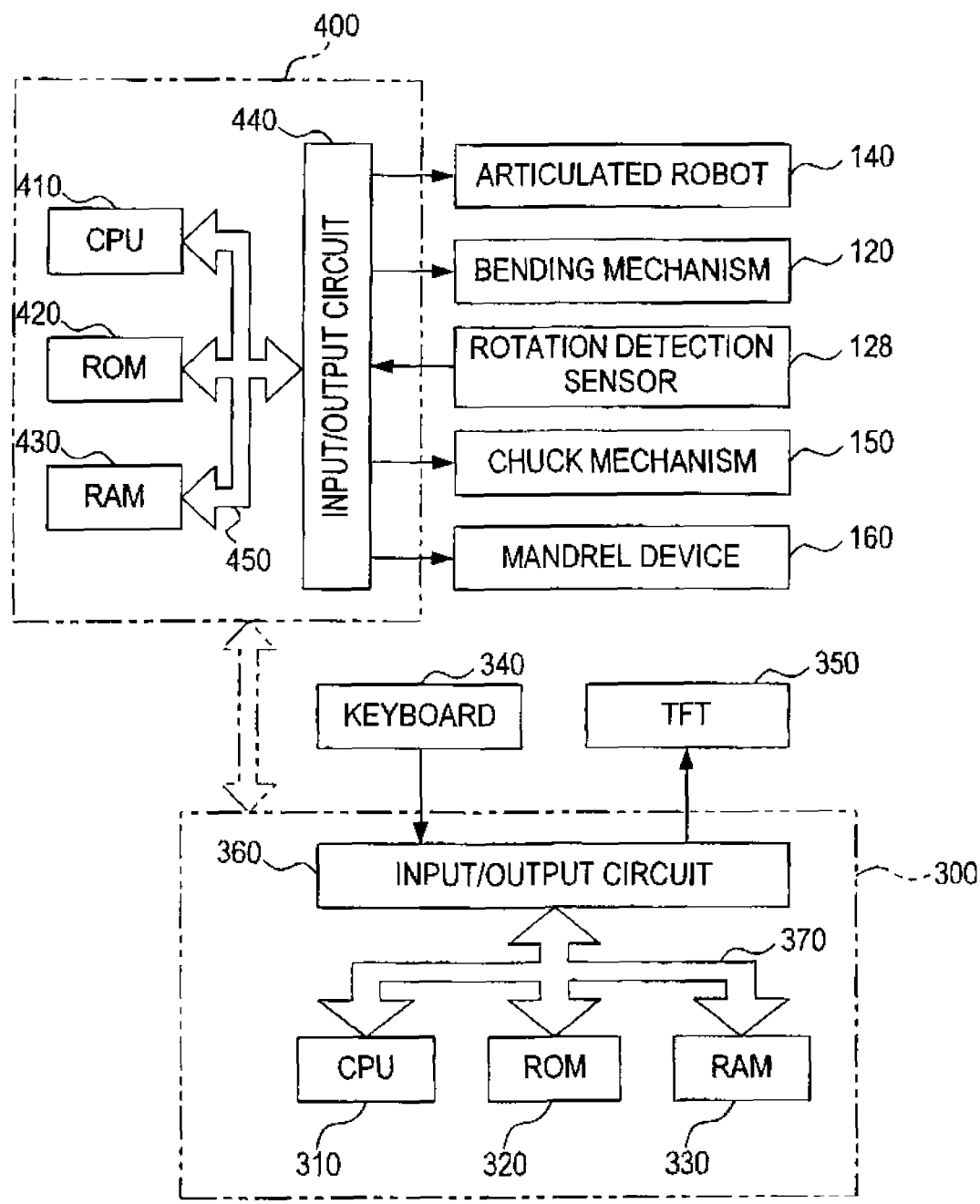
FIG. 12 is a block diagram showing a control system of the bending device according to Embodiment 2.

With reference to FIG. 12, the bending device 100 according to the present embodiment is driven and controlled by a host computer 300 and a control device 400, and carries out insertion, bending and unloading of the object 180. The host computer 300 is provided with a CPU 310, a ROM 320 and a RAM 330 as the major components of logic calculation circuits. The CPU 310, ROM 320 and RAM 330 are connected, via a common bus 370, to an input/output circuit 360 that inputs and outputs signals between a keyboard 340 and a TFT display unit 350.

Data regarding a loading process, a bending process and an unloading process, which are carried out with respect to the object 180, are inputted from the keyboard 340 operated by an operator into the host computer 300. The host computer 300 prepares programs to actuate the articulated robot 140, the bending mechanism 120, the chuck mechanism 150 and the mandrel device 160, and the prepared programs are transmitted from the host computer 300 to the control device 400.

The control device 400 is provided with a CPU 410, a ROM 420, and a RAM 430 as the major components of logic calculation circuits. The CPU 410, ROM 420 and RAM 430 are connected, via a common bus 450, to the input/out circuit 440. The articulated robot 140, bending mechanism 120, chuck mechanism 150, mandrel device 160 and rotation detection sensor 128 to detect the turning angle of the bending mechanism 120 are connected to the input/output circuit 440.

Figure 13:
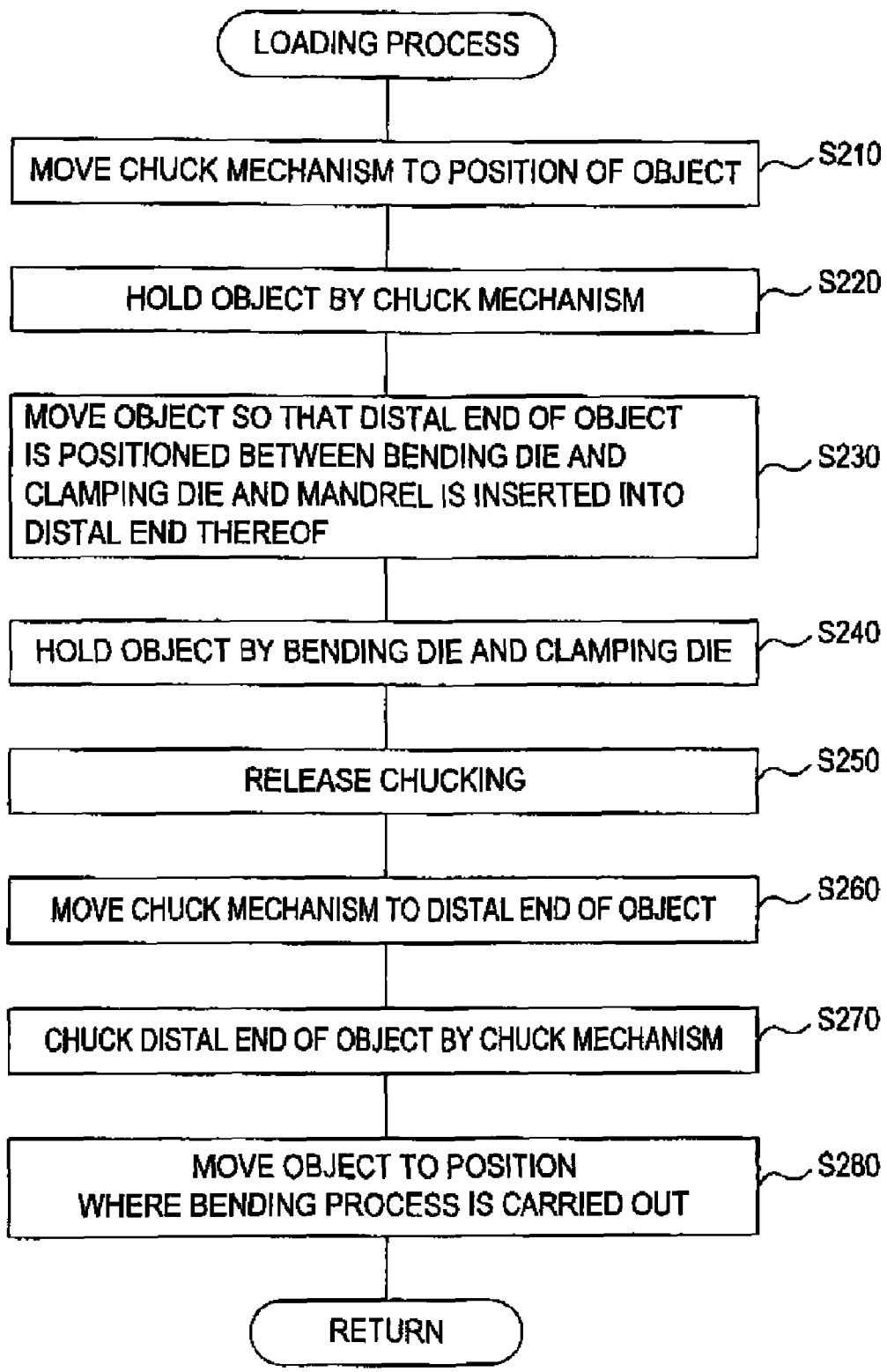
FIG. 13 is a flowchart showing one example of a moving process of the chuck mechanism, which is carried out in the control circuit according to Embodiment 2.

FIG. 13 is a flowchart describing a loading motion of an object from the state shown in FIG. 7 to the state shown in FIG. 8 and FIG. 9. Next, a detailed description is given of a loading motion of the object 180.

As shown in FIG. 7, by operating the articulated robot 140, the chuck mechanism 150 is moved to the position where the object 180 to be loaded is placed on the placement base 200 (Step 210).

Next, the middle part of the object 180 is held by the first fixing portion 154 of the chuck mechanism 150 (Step 220).

Figure 14:
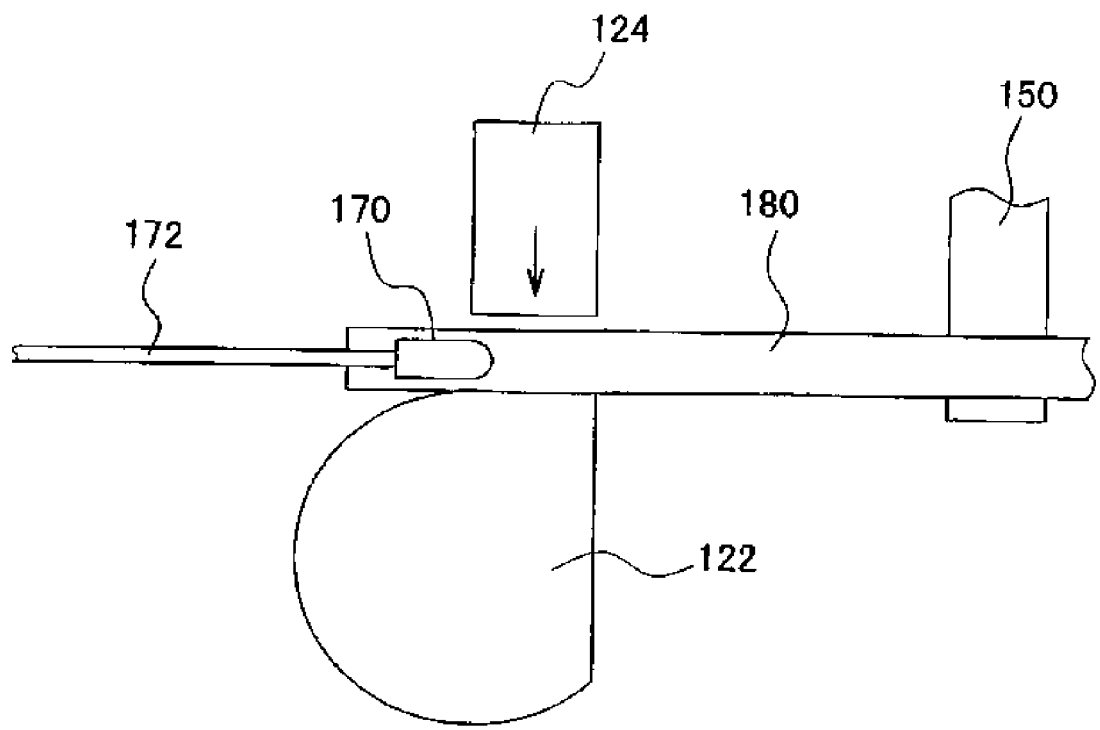
FIG. 14 is a schematic view showing operations of the chuck mechanism.
Figure 15:
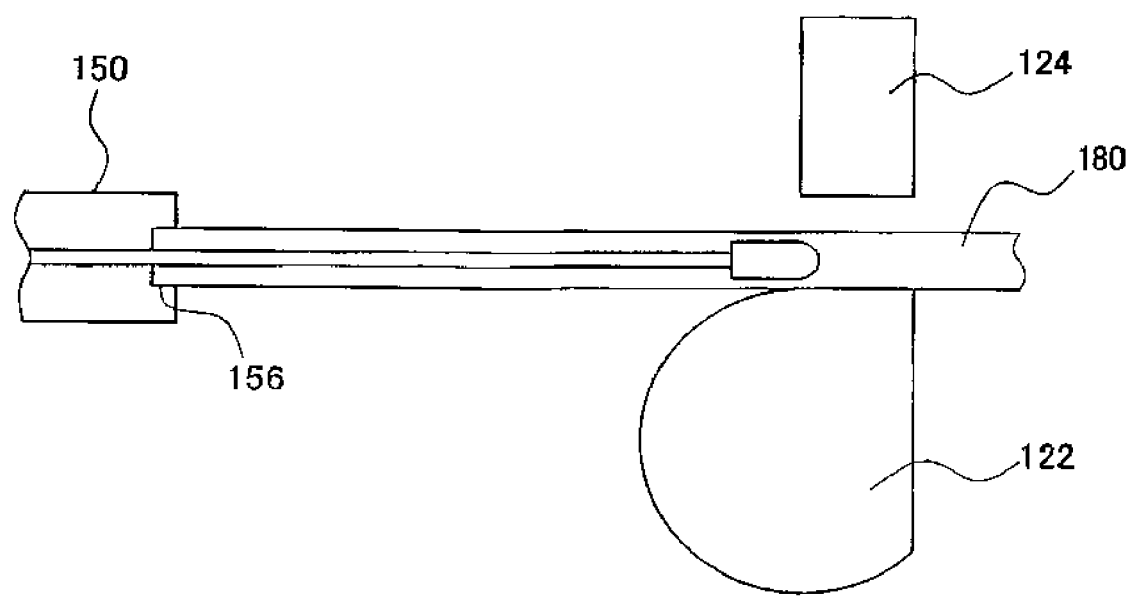
FIG. 15 is a schematic view showing operations of the chuck mechanism.

Next, the object 180 is conveyed into the bending device 100 by operating the articulated robot 140. However, at this time, as shown in FIG. 14, the object 180 is moved (Step 230) so that the distal end portion of the object 180 is positioned between the bending die 122 and the clamping die 124 of the bending mechanism 120, and simultaneously the mandrel 170 is inserted into the distal end portion of the object 180. It is sufficient that the distal end of the object 180 is moved to the position where it goes over the mandrel 170. Also, as shown in FIG. 14, the mandrel 170 is held in advance by the mandrel device 160 at a position existing between the bending die 122 and the clamping die 124.

Next, the object 180 is held between the clamping die 124 and the bending die 122 by operating the clamping die 124 (Step 240).

Next, chucking of the chuck mechanism 150 is released (Step 250).

Next, the chuck mechanism 150 is moved to the distal end position of the object 180 by operating the articulated robot 140 (Step 260). At this time, the posture of the chuck mechanism 150 is changed so that the object 180 is fixed by the second fixing portion 156 of the chuck mechanism 150. Also, as shown in FIG. 10, since the chuck mechanism 150 is provided with a notched part 152, it is possible to insert the rod 172 into the interior of the chuck mechanism 150 through the notched part 152.

Next, the distal end portion of the object 180 is chucked by the chuck mechanism 150 (Step 270).

Next, clamping of the object 180, which is carried out by the clamping die 124 and the bending die 122, is released, and the object 180 is moved to a predetermined position where a bending process is carried out (Step 280). If necessary for the movement, by twisting the rear part of the second arm 144 by an angle of 180 degrees, it is possible to change the posture of the distal end arm 148 and the chuck mechanism 150, which are components disposed further from the turning joint 146.

Thus, the bending device 100 is entered into the state shown in FIG. 8 and FIG. 9, and a bending process is carried out thereafter. Further, since an operation of the bending process is the same as that of Embodiment 1, the description thereof is omitted. However, a brief description is given of a following function of the articulated robot 140.

When carrying out a bending process for the object 180, although the object 180 is given tension in line with bending, the articulated robot 140 is controlled so as to operate so that the chuck mechanism 150 follows with a smaller force than the tensile force at the bending mechanism 120 side. By thus controlling, highly accurate bending can be carried out.

As described above, the present invention is not limited to such embodiments. The invention may be subjected to various modifications and variations within the scope not departing from the spirit of the present invention.

What is claimed is:

1. A bending device comprising:
   a base member;
   a bending mechanism rotatably fixed to the base member and having a bending die and a clamping die which is able to revolve around the bending die, the bending mechanism configured for holding an elongated object to be processed by the bending die and the clamping die and for revolving on the base member;
   an articulated robot provided on the base member; and
   a chuck mechanism, attached to the articulated robot, to hold the elongated object,
   wherein the chuck mechanism includes a first holding portion for holding an end of the elongated object for bending of the elongated object and a second holding portion for holding a middle part of the elongated object while conveying the elongated object from a place where the elongated object is stored to a place where bending is carried out.

2. The bending device according to claim 1, comprising a controlling unit for controlling the articulated robot, the bending mechanism and the chuck mechanism, wherein the controlling unit includes bending control unit for carrying out bending processes at a plurality of points by moving the chuck mechanism by means of the articulated robot.

3. The bending device according to claim 1, comprising a controlling unit for controlling the articulated robot, the bending mechanism and the chuck mechanism, articulated robot, the bending mechanism and the chuck mechanism, wherein the controlling unit includes a bending control unit for carrying out bending processes at a plurality of points by moving the chuck mechanism by means of the articulated robot.

4. The bending device according to claim 2, wherein the controlling unit controls the articulated robot, the bending mechanism and the chuck mechanism and causes the chuck mechanism to hold the middle part of an object when loading the object, and causes the chuck mechanism to hold the distal end portion of the object when carrying out a bending process.

5. The bending device according to claim 3, wherein the controlling unit controls the articulated robot, the bending mechanism and the chuck mechanism and causes the chuck mechanism to hold the middle part of an object when loading the object, and causes the chuck mechanism to hold the distal end portion of the object when carrying out a bending process.

* * * * *